Sept. 7, 1943.　　　G. H. GILL　　　2,329,158
FASTENING MEANS
Filed July 27, 1942
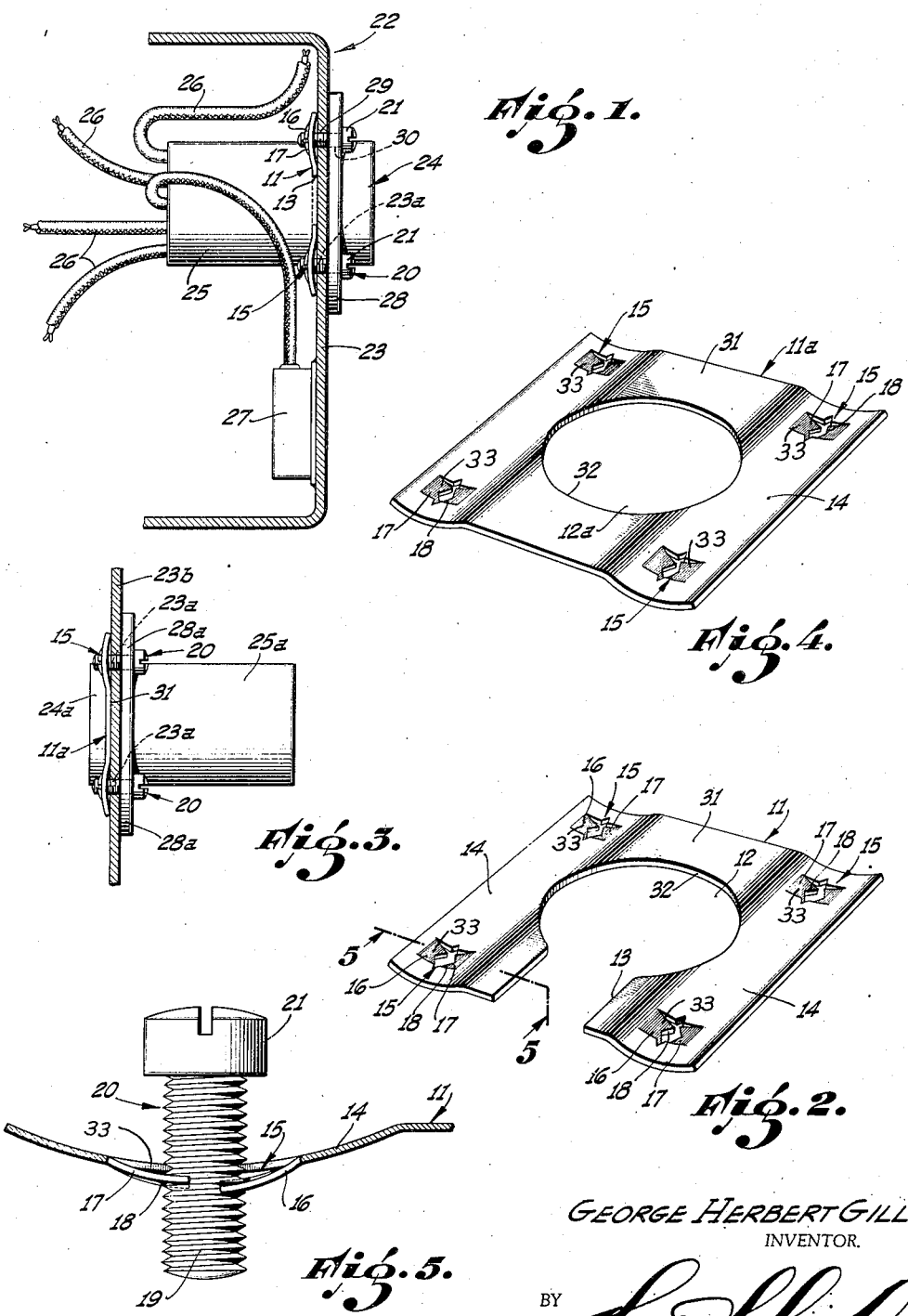
GEORGE HERBERT GILL,
INVENTOR.
BY
ATTORNEY.

Patented Sept. 7, 1943

2,329,158

UNITED STATES PATENT OFFICE 2,329,158

FASTENING MEANS

George Herbert Gill, Los Angeles, Calif., assignor to The Garret Corporation, Airesearch Manufacturing Company division, Inglewood, Calif., a corporation of California Application July 27, 1942, Serial No. 452,379

5 Claims. (Cl. 248—27)

My invention relates to fastening means which may be used in cooperation with screws to secure parts to walls or openings formed in walls.

Although not limited thereto, the invention is especially useful and produces important economies in the mounting of small parts, such as electrical receptacles, in openings of walls situated so that the rear ends of the securing screws are either not visible or are relatively inaccessible. For example, a small part of the class described may be mounted in the opening of an outlet or switch box in the electrical system of an aircraft by means of screws which project through screw openings in the metal wall of the box. Very often the workman must work from a position where he cannot see the inner or rear face of the wall and must place the nuts on the screws by feel alone. At other times the end of the screw on which he must place the nut is visible but in such small space that great difficulty in holding the nut in proper position is encountered. Therefore, to hold nuts in positions to receive the inner ends of the screws which have been projected through the screw openings, or to thread the nuts onto the rear ends of such screws, is found to be a difficult task and much time is ordinarily consumed in starting the nuts on the screws, especially where the rear ends of the screws and the nuts being applied thereto are not visible to the workman, or where restricted space conditions or the presence of wires or other parts interfere with the free use of the hand or fingers of the workman. In the use of my present invention all of the difficulties suggested above are eliminated, and the operation of placing and tightening the screws and nuts is quickly accomplished.

It is an object of the invention to provide a screw fastening means of the class described herein having a plurality of openings to receive the rear or threaded ends of the screws, and means associated with these openings to engage the threads of the screws in such a manner that the screws may be tightened up, this fastening means being so formed that the rear ends of the screws may be quickly brought into cooperative engagement with the openings of the screws and the thread engaging means associated therewith, thereby avoiding the very considerable loss of time now expended in fastening the same types of screws by use of the nut or separate fastening means now known to the art.

It is also an object of the invention to provide a fastening means to receive the threaded ends of screws which have been passed through openings in a wall, this fastening means being equipped with guide portions making it possible to guide the screw receiving opening thereof into cooperative relation to the threaded end of the screw, so that it is not necessary for the workman to see the rear end of the screw or the fastening means in order to bring the same into cooperative engagement. In the preferred form of the invention the fastening means is provided with two guide walls, one of which maintains the axis of the screw receiving opening of the fastening means parallel to or aligned with the axis of the screw, and the other of which guides the movement of the fastening means so that by movement thereof along the single line or in the single direction determined by the guide means, the screw receiving opening of the fastening means may be quickly brought into position to receive the threaded end of the screw.

It is another object of the invention to provide a screw fastener of the character described adapted for securement to a wall, one face of which is relatively inaccessible, of an elongated body cylindrical or otherwise which projects through the wall from the accessible side to the inaccessible side thereof, and constructed so that the screw receiving openings in the fastener may be readily aligned with those of the wall and in particular may be readily aligned in this manner by reason of the fact that the nut is so constructed with relation to the body projecting through the wall that upon alignment of one of the screw openings of the fastener or nut means with the wall opening, the remaining openings automatically come into registry with the wall opening for insertion of the screws without the necessity of access by the operator to the relatively inaccessible side of the wall against which the fastener is placed.

It is still another object of the invention to provide a screw fastener or plate nut of the character described constructed to fulfill the purposes just mentioned which shall also be shaped to permit the assembling to this nut of a body projecting through the wall from the accessible to the inaccessible side thereof which has a retaining flange at one end for disposition against the accessible side of the wall and has one or more electrical flexible conductors connected to the other end thereof.

Other objects and advantages of the invention will appear from the following description, from the drawing, and from the appended claims.

Referring to the drawing, which is for illustrative purposes only,

Fig. 1 is a side elevation of a fastening means embodying the invention in utility combination with an electrical wiring box shown in section and with a conductor terminal socket secured by the fastening means to a wall of the box.

Fig. 2 is an enlarged perspective view of my new fastening means.

Fig. 3 is a view similar to Fig. 1 but showing a second form of my fastening means in utility combination with a wall and an object of a different kind from that shown in Fig. 1.

Fig. 4 is an enlarged perspective view of the plate nut of Fig. 3 which has a different form from that shown in Fig. 2 but also embodies this invention.

Fig. 5 is an enlarged sectional view taken on the line 5—5 of Fig. 2 showing additionally a screw threaded bolt in side elevation in operative position with relation to the plate nut.

Referring to Fig. 2, a fastening means in the form of a plate nut generally designated by the numeral 11 consists of a preferably rectangular plate of thin spring metal having a central circular opening 12 and a slot 13 connecting the opening 12 with an outside edge of the plate, the sides of the slot 13 being parallel to two sides of the plate 11. The plate is formed to have a pair of shallow ridges 14 of arcuate cross section adjacent and parallel to opposite edges of the plate and preferably extending across the plate from end to end thereof in a direction parallel to the slot 13.

The plate 11 is stamped in the course of its fabrication to provide a plurality of openings 15 each disposed on the crown line of one of the ridges 14. In the stamping operation a pair of tongues 16 and 17 are formed in association with each of the openings 15. Each of these tongues 16 and 17 has its root at an intermediate line on the sloping side of the ridge 14 and extends with laterally free edges to the opening 15, preferably at an angle of inclination to the plane of the main body portion of the plate 11 which is greater than the angle of inclination of the wall of the ridge 14 to the plane of the plate at the line where the root of the tongue is joined to the wall of the ridge. The opening 15 is preferably diamond shaped providing a notched inner edge 18 on each jaw for engagement, as may be best seen in Fig. 5, with threads 19 of a screw or bolt 20 having a slotted head 21. The inner thread engaging edges 18 of the tongues 16 and 17 are given a small slope in opposite directions longitudinally of the ridge 14 in a manner to give them the character of the single turn of a thread of the same pitch as the threads 19 of the screw 20 that they may readily conform to and engage the threads 19.

When the plate 11 is placed with its upper side as seen in Fig. 5 against a wall member (not shown) and the screw 20 is inserted through a perforation in the wall member and through the opening 15 in the plate 11 and turned to tighten its head 21 against the upper face of the wall member, the jaws 16 and 17 are engaged and pulled upwardly and given a biting engagement with the thread 19 by reason of their elasticity. This engagement firmly locks in place the screw 20 preventing its accidental displacement. The bite of the jaws 16 and 17 on the threads 19 has additional strength by reason of the resilient character of the arch shaped wall of the ridge 14. The action of the wall of the ridge 14 in increasing the bite of the jaws 16 and 17 on the threads 19 is made more effective by the extended character of the ridge which does not consist merely of a pair of narrow tie bars on each side of the opening as in fastening means of a similar character heretofore known and used, but extends completely across the plate nut greatly increasing the gripping power of the self-locking engagement of the jaws with the screw threads. It is apparent that this novel feature of a screw receiving opening at the crown of an elongated ridge is not limited to a plate nut having a central circular opening like that shown at 12 in Fig. 2 or having an opening of any kind.

In Fig. 1 the plate nut 11 is shown in operative position in a utility combination. A box 22 containing electrical devices such as that shown at 27 and for making electrical connections to such devices contained within it and to other devices without its walls, is shown with a side wall 23 circularly apertured at 23a to receive and mount in fixed position a connector 24 having in its right end face terminal sockets (not shown) for the reception of the terminal pins of a multiple conductor terminal plug and having connected within its hollow interior chamber and issuing from its left end a plurality of corresponding conductors 26 leading to electrical devices such as that shown at 27 either within or without the box 22. The connector 24 has a cylindrical body 25 and an annular flange 28 which lies against the wall 23 of the box 22. The flange 28 and wall 23 have a plurality of screw receiving perforations 30 and 29 respectively arranged on centers according to a pattern similar to that of the plate nut 11. As shown in the drawing, this pattern is rectangular in shape but it will be understood that any other pattern may be used for the flange, side wall, and plate nut which disposes a plurality of screw receiving openings about the body 25 so distributed as to provide proper securement of the connector 24 to the box 22.

The plate nut 11 may be placed in position and installed by any method which accords with the particular conditions which may obtain. As an example of a method of installation, the conductors 26 with their left ends connected as may be required may be threaded through the circular opening 23a of the wall 23 and their free ends properly fastened as by soldering to the terminals within the body 25, the connector 24 at this time being held by the operator to the right of the wall 23. The plate nut 11 may then be inserted in the box 22 by the operator, using an open side of the box or an access opening in one of the walls for this purpose. The connector 24 is then pushed through the opening 22a therefor in the wall 23 and the plate 11 is at the same time manipulated in the box to thread the conductors 26 laterally through the slot 13 and into the circular aperture 12 and to slide the plate by means of the aperture 12, over the connector body 25 toward and into contact with the inner face of the wall 23. The connector 24 is then turned to align the perforations 30 with the perforations 29. One of the screws 20 is then passed through a pair of registering perforations 30 and 29 until its inner end projects slightly beyond the inner face of the wall 23. The plate nut 11 is then rotated slowly on the body 25 until the inner end of the screw 20 drops into an aperture 15, a movement which is facilitated by the sloping concave face of the associated ridge 14. This first screw 20 is then turned in engagement with the jaws 16 and 17 to tightly clamp together the flange 28 and wall 23. The remaining screws 20 are then inserted in the proper positions and tightened. It will be observed that while the slot 13 facilitates the installation method just described, it is not necessary to the installation, as the plate nut 11 may be placed in position over the large circular opening 23a in the wall 23 prior to threading the conductors through this opening preparatory to connecting them to the connector 24. The slot 13 however obviates the need of manually holding the plate nut in position as each conductor 26 is passed through the opening 23a in the wall 23.

The fastening means 11 or 11a has a guide wall consisting of the surface 31 for engaging the face of the wall 23 so as to maintain the axes of the screw receiving openings perpendicular to the wall 23, so that when a screw receiving opening 15 is brought into alignment with the threaded end of a screw 20, the axis of the screw will be aligned with the axis of the aperture 15. Each fastener 11 or 11a has guide wall or surface 32 which, by engagement with the cylindrical surface of the part 24 or 24a limits the movement of the plate 11 or 11a to a single direction, as long as the plate is held against the face of the wall 23. At this time the engagement of the wall 32 with the cylindrical body of the part 24 or 24a limits the movement of the plate to rotation, and such rotation will cause the apertures 15 and the shallow pockets 33 at the portals thereof to come into or pass through positions of alignment with the screw openings 29 in the wall 23. Accordingly, the end of a screw placed in the opening 29 may be caused by slight pressure to engage the surface 31 of the plate, and when rotation of the plate brings an aperture 15 and its associated pocket 33 into alignment therewith the end of the screw will move into the pocket, which engagement will be readily perceived by the workman.

If desired, the installation method above described may be varied by holding the plate nut 11 approximately in position against the wall 23 prior to inserting the body 25 of the connector 24 and with the plate so held passing a smooth sided basting pin (not shown) of small diameter through one of the perforations 29 and one of the openings 15. The connector 24 may then be pushed into position passing one of the perforations 30 over the basting pin. With the parts in this position, a screw 20 may be inserted through one of the other perforations 30, 29 and opening 15 and tightened and the basting pin thereafter pushed through the wall 23 and dropped into the interior of the box 22 by pushing it with another screw 20 inserted through the perforation and opening occupied by the basting pin. The remaining screws 20 may be of course inserted and turned to position either before or after the ejection of the basting pin.

The principles of the invention may be embodied in plate nuts of the general character described in various utility combinations other than that shown in Fig. 1. Fig. 3 illustrates another use for a plate nut constructed in accordance with the invention.

In this figure, 24a designates a cylindrical body which may be a hollow cylindrical insulator of suitable dielectric material for protectively enclosing electrical conductors which pass through an opening in a wall 23b having a relatively accessible right side and a relatively inaccessible left side. The insulator 24a has a body 25a and a flange 28a, the wall 23b having a circular opening 23a for receiving the body 25a and the wall 23b and flanges 28a having registering perforations for the screws 20. A plate nut 11a preferably of that form shown in Fig. 4 without a slot connecting the circular central aperture 12a with the outer edge of the plate is placed in position against the left hand face of the wall 23b and the screws 20 are inserted and tightened, as by either of the two methods described in connection with the explanation of the installation shown in Fig. 1.

As explained when describing the combination shown in Fig. 1, under some conditions a plate nut of the type shown in Fig. 2 having a slot 13 may facilitate the operation of assembling the cylindrical body 24a and the plate nut 11a in position preparatory to insertion and tightening of the screws 20.

The invention as to some of its features is not limited to a plate fastening means in the form of a plate. Thus a plurality of single nut means each adapted for the threaded reception of a shank of a corresponding screw may be secured to a flat frame structure formed of wire or other suitable means, this frame structure being so constructed as to provide an aperture to pass over the body of a connector plug or other similar part and also to provide if desired an opening extending from the aperture to the edge of the frame for the accommodation of the plug conductors. The plate may also be made of other materials than metal, such as fibre.

I claim as my invention:

1. A fastening nut means for use with fastening screws to clamp a cylindrical body, having an annular flange means perforated to receive the fastening screws, to a wall apertured to receive the cylinder and screws, with the flange against a relatively accessible outside face of said wall, the perforations being arranged on at least two parallel center lines with at least two perforations on each center line, said fastening means comprising a plate for placement against a relatively inaccessible inside face of said wall, said plate being formed with a shallow elongated ridge arcuately contoured in transverse section corresponding to each of said center lines and being centrally apertured to snugly encircle said cylindrical body and being further formed with a plurality of openings along the top portion of each of said ridges on centers in correspondence to said perforations for receiving the threaded shanks of the screws, the opposite edges of the openings being notched and slitted to provide laterally extending free jaws for operatively engaging the threads on the shanks of the fastening screws and the free ends of said jaws being disposed above the crown of said ridge wall.

2. A fastening nut means for use with fastening screws, to secure to a wall having an opening therein a member having a cylindrical body portion to project through said opening and flange means projecting from said member in overlapping relation to said wall, there being cooperating apertures in said wall and said flange means receiving said fastening screws, said fastening means comprising a plate for placement against the exposed face of said wall and being of a size to substantially surround said body portion of said member with a gap therein of a width less than the diameter of said body portion, said plate being stamped so as to provide a plurality of convex humps with screw-receiving perforations therein and outwardly sloped screw-thread engaging jaws disposed on opposite sides of each of said perforations so that the extremities of said jaws will engage the threads of screws which have been passed through said apertures, said plate having an inner wall portion for guiding engagement with said body portion whereby said perforations will be held at fixed radial distances from the axis of said body portion.

3. A fastening nut means, for use with fastening screws, to secure to a wall having an opening therein a member having a cylindrical body portion to project through said opening and flange means projecting from said member in overlapping relation to said wall, there being cooperating apertures in said wall and said flange means receiving said fastening screws, said fastening means comprising a plate for placement against the exposed face of said wall and being of a size to substantially surround said body portion of said member, said plate being stamped so as to provide a plurality of convex humps with screw-receiving perforations therein and outwardly sloped screw-thread engaging jaws disposed on opposite sides of each of said perforations so that the extremities of said jaws will engage the threads of screws which have been passed through said apertures, said plate having an inner wall portion for guiding engagement with said body portion whereby said perforations will be held at fixed radial distances from the axis of said body portion.

4. A fastening nut means, for use with fastening screws, to secure to a wall having an opening therein a member having a body portion to project through said opening and flange means projecting from said member in overlapping relation to said wall, there being cooperating apertures in said wall and said flange means receiving said fastening screws, said fastening means comprising a plate for placement against the exposed face of said wall and being of a size to substantially surround said body portion of said member, said plate being stamped to provide a plurality of screw receiving perforations aligned with said apertures and outwardly sloped screw-thread engaging jaws disposed on opposite sides of each of said perforations so that the extremities of said jaws will engage the threads of screws which have been passed through said apertures, said plate having an inner wall portion for guiding engagement with said body portion whereby said perforations will be held at fixed radial distances from the axis of said body portion.

5. A fastening nut means, for use with fastening screws, to secure to a wall having an opening therein a member having a body portion to project through said opening and flange means projecting from said member in overlapping relation to said wall, there being cooperating apertures in said wall and said flange means receiving said fastening screws, said fastening means comprising a plate for placement against the exposed face of said wall and being of a size to substantially surround said body portion of said member, with a gap therein of a width less than the diameter of said body portion, said plate being stamped to provide a plurality of screw receiving perforations aligned with said apertures and engaging means disposed at the sides of each of said perforations so as to engage the threads of screws which have been passed through said apertures, said plate having an inner wall portion for guiding engagement with said body portion whereby said perforations will be held at fixed radial distances from the axis of said body portion.

GEORGE HERBERT GILL.